(12) United States Patent
Miyashita et al.

(10) Patent No.: US 12,704,200 B1
(45) **Date of Patent: *Aug. 11, 2026**

(54) PORTABLE HOSE STAND SYSTEM

(71) Applicant: EZ Hose LLC, Honolulu, HI (US)

(72) Inventors: Robert Saburo Miyashita, Honolulu, HI (US); Thomas Lee Maglinao, Honolulu, HI (US)

(73) Assignee: EZ Hose LLC, Honolulu, HI (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/657,694

(22) Filed: May 7, 2024

Related U.S. Application Data

(63) Continuation of application No. 17/558,851, filed on Dec. 22, 2021, now Pat. No. 11,988,309.

(60) Provisional application No. 63/180,797, filed on Apr. 28, 2021.

(51) Int. Cl.

| | |
|---|---|
| ***F16L 3/00*** | (2006.01) |
| ***F16M 11/06*** | (2006.01) |
| ***F16M 11/32*** | (2006.01) |

(52) U.S. Cl.
CPC .............. *F16L 3/003* (2013.01); *F16M 11/06* (2013.01); *F16M 11/32* (2013.01)

(58) Field of Classification Search
CPC ........ F16L 3/003; B05B 15/62; B05B 15/622; B05B 15/625; B05B 15/628; A62C 31/28; F16M 11/32; F16M 11/16; F16M 11/06; F41A 23/12; F41A 23/14; E03C 1/057
USPC ...... 248/80–88, 163.2, 170–171, 440.1, 166, 248/113; 211/87.01, 60.1
See application file for complete search history.

(56) References Cited

U.S. PATENT DOCUMENTS

| | | | | |
|---|---|---|---|---|
| 199,576 | A * | 1/1878 | Rodig | A62C 31/28 248/81 |
| 1,246,492 | A | 11/1917 | Thiele | |
| 1,367,780 | A | 2/1921 | Jolliff | |
| 1,534,438 | A | 4/1925 | Abby | |
| 1,591,374 | A | 7/1926 | Hammill | |
| 2,309,772 | A | 2/1943 | Karger | |
| 2,424,708 | A | 7/1947 | Resch | |
| 2,425,893 | A | 8/1947 | Molitor | |
| 3,334,852 | A | 8/1967 | Sumida et al. | |
| 4,712,756 | A | 12/1987 | Kester et al. | |
| 4,815,645 | A | 3/1989 | Higgins | |
| 5,005,790 | A | 4/1991 | Harris, III | |
| 6,349,905 | B1 | 2/2002 | Mills | |
| 8,807,521 | B2 | 8/2014 | Dunki-Jacobs et al. | |
| 9,266,138 | B1 | 2/2016 | Massaro | |
| 10,557,571 | B2 | 2/2020 | Arnold | |

(Continued)

*Primary Examiner* — Ingrid M Weinhold
(74) *Attorney, Agent, or Firm* — Invention To Patent Services; Alex Hobson

(57) ABSTRACT

A portable hose stand system enables the user to project a stream of water from a water hose or hose nozzle in a fixed direction. A hose receiver is configured to receive and retain a hose and is coupled with pivot to allow adjustment of a desire water flow direction and a pivot retainer locks in a desired position. The hose receive is configured on an extended end of a hose extension that extends from a stand body. Retractable legs extend down from the stand body and pivot away from each other to provide a stable base. Water flow may be controlled through the use of a motion sensor valve. Lastly, a wall mount serves as a receiver for the portable hose stand system as a faucet and/or shower.

13 Claims, 12 Drawing Sheets

(56) References Cited

U.S. PATENT DOCUMENTS

| | | | | |
|---|---|---|---|---|
| 11,988,309 | B1 * | 5/2024 | Miyashita | F16M 11/10 |
| 12,214,368 | B1 * | 2/2025 | Miyashita | B05B 12/122 |
| 2006/0291961 | A1 | 12/2006 | Tsai | |
| 2019/0003635 | A1 | 1/2019 | Li et al. | |

* cited by examiner 10
80
70
54
56
58
51
53
52
68
60
42
41
40
44
49'
49
10
70
71
40
40'
41
10
70
76
80
78
30
32
68
60
41
40'
72
71
70
10
34
36
40'
40
41

71
74
73
70

70
80
84
86

71
70
72
73
74
75
82
80
84
86

PORTABLE HOSE STAND SYSTEM

CROSS REFERENCE TO RELATED APPLICATIONS

This application is a continuation of U.S. patent application Ser. No. 17/558,851, filed on Dec. 22, 2021, which claims the benefit of priority to U.S. provisional patent application No. 63/180,797, filed on Apr. 28, 2021; the entirety of all prior applications are hereby incorporated by reference herein.

BACKGROUND OF THE INVENTION

Field of the Invention

The invention relates to a portable hose stand system.

Background

There are many situations when it would be desirable to have a fixed projection of a stream of water without holding the hose or nozzle. For example, when washing the car, a dog, equipment, or even for showering, the user may prefer using both their hands to do the task more efficiently. In addition, a person may want to project water over a specific area without having to be physically present such as watering the lawn or garden. Often times, an intermittent and controlled stream of water is desired and frequently turning the water off at a hose bib or by the nozzle can be time consuming and less water efficient.

SUMMARY OF THE INVENTION

The invention is directed to a portable hose stand system that includes a portable hose stand configured to retain a hose to direct a water spray in a specific direction. The stand may have retractable legs that enable a secure base for retaining the hose nozzle in an extended position from the stand body by a hose extension. The hose extension from the stand body may have a plurality of extension portions that are telescoping to enable the hose nozzle to be retained up above a person for showering, for example. A hose receiver may be configured on the extended end of the hose extension to enable the hose and/or hose nozzle to be detachably attached. A nozzle pivot may enable the hose nozzle to be directed in a desired direction and locked into place. A motion sensor valve may be configured proximal to the hose nozzle, such as between the hose receiver and the hose nozzle to provide a quick, efficient and convenient means to turn on and off the flow of water. The portable hose stand may be configured to be detachably attached to a wall mount, having one or more wall mount clips to retain the portable hose stand. The hose retainer may be coupled with the nozzle pivot and a nozzle pivot post may be configured to detachably attach to the extended end of the hose extension. This same nozzle pivot post may be configured to detachably attach to a wall mount adapter that is coupled with the wall mount.

An exemplary portable hose stand has retractable legs that pivot away from an extension leg and may also pivot away from each other to provide a stable base having three points of contact. The retractable legs may be coupled with a leg receptable and a leg assembly pivot may enable the leg receptacle and retractable legs to pivot away from the extension leg. A leg assembly spring may force the leg receptacle and retractable legs to pivot away from the extension leg. Also, the leg assembly pivot may have a plurality of notches or apertures for receiving a pivot pin to secure the retractable legs in a pivoted orientation from the extension leg, such as at a retractable leg angle of about 30 degrees or more, about 45 degrees or more, about 60 degrees or more and any range between and including the retractable leg angles provided. In addition, the two retractable legs may be configured to pivot away from each other by a leg pivot spring, which may be a torsional spring configured around the leg pivot. The two retractable legs may pivot away from each other a leg angle of about 30 degrees or more, about 45 degrees or more, about 60 degrees or more, about 75 degrees or more and any range between and including the leg angles provided. Furthermore, the extension leg and/or the retractable legs may have a plurality of portions that telescope to enable adjustment of the length of the legs. This ability to change the length of the legs, in particular the retractable legs, enables the stand to be positioned for stability on uneven surfaces, such as on a sloped driveway or yard, for example.

An exemplary hose extension enables the hose receiver to be extended up away from the stand body. The hose extension may have a coupled hose extension that is coupled to the stand body and may extend from the extension leg. In an exemplary embodiment, the coupled hose extension extends into and out of the extension leg. The hose extension may have a first hose extension that extends from the coupled hose extension. A hose extension retainer may be configured to retain a hose extension in a desired extended position. A hose extension retainer may be a collar or clip that compresses the outer hose extension or extension leg around the inner hose extension. A hose extension assembly may have one or more hose extensions, such as two or more, three or more, four or more or any range between and including the number of hose extensions provided. A plurality of hose extensions may be telescoping with one extending into the other. The hose extension may be configured to extend the hose nozzle to a height of about 1.5 m or more, about 1.75 m or more, about 2.0 m or more about 2.5 m or more and any range between and including the height values provided. These heights may be the height of the hose nozzle when the retractable leg angle is about 60 degrees, or wherein the extension leg and hose extensions extend at an angle of about 60 degrees from a horizontal ground surface.

A weight, such as a bucket and most preferably a collapsible bucket or weight bag may be retained to the portable hose stand to provide additional stability. A collapsible bucket may be made out of a fabric, a coated fabric, or film of material and may be configured to fold for storage. A collapsible bucket may have a flat base panel and a cylindrical side extending up from the base panel to retain water therein. When water is placed in the bucket the weight of the water may fill out the collapsible bucket so that it retains a bucket shape. The bucket may have a handle that is secured by the stand body, such as around one or more of the legs or to a hook configured on the stand body. The weight may be centrally configured under the stand body such as under and between the legs. The weight may hang from a hook on the stand body or the handle of the weight may extend around one or more of the legs. A collapsible bucket may have water placed therein, such as from the hose, to provide an effective weight for stability of the portable hose stand. When finished with the portable hose stand, the water in the collapsible bucket can be poured out and the collapsible bucket can be collapsed for compact storage.

A hose receiver may be configured on the extended end of the hose extension and may have a receiver clamp that can be squeezed to open a receiver channel for retaining the hose or hose nozzle. A hose receiver pivot may enable the clamp to open or move a first receiver portion with respect to a second receiver portion. A nozzle pivot 80 may be coupled with the hose receiver or with the hose nozzle to enable the hose nozzle to be directed in a desired orientation and locked into place by the nozzle pivot lock. A nozzle pivot post may extend from the nozzle pivot and be configured to extend into the extended end of the hose extension. The nozzle pivot post may have a nozzle pivot post retainer that is adapted to couple with a hose extension retainer. For example, the nozzle pivot post retainer may be a ball and the hose extension may have an aperture to receive the ball. Also, this nozzle pivot post may be configured to be inserted into and retained by a wall mount adapter that is coupled with a wall mount. In this way, the hose can be secured to a wall mount without the portable hose stand, or stand body and legs. The wall mount adapter may have an aperture to receive the ball or the nozzle pivot post retainer.

An exemplary portable hose stand system may include a motion sensor valve that enables the flow of water to be activated and stopped by motion, such as by placing your hand in a sensor curtain. An exemplary motion sensor detects when a light curtain in broken. A sensor curtain is formed between a light emitter and light receiver and the motion sensor detects a break in the light. The motion sensor is coupled with a valve actuator that opens and closes a valve to initiate and stop the flow of water through the motion sensor valve. The motion sensor valve may have batteries to power the system and a lock-out switch to disable the valve actuator to prevent unwanted stopping or starting of the flow of water. The lock-out switch may be switch to prevent the water from being turned on when the hose and portable hose stand are not in use, for example. The motion sensor valve may have an inlet to receive the hose and an outlet to couple with a hose nozzle for example. Each of the inlet and outlet may be threaded connections for coupling with the hose and hose nozzle. The motion sensor valve may be used to conserve water. When washing a vehicle or a pet, it may be desirable to turn the water on and off as needed versus letting the water run continuously. The motion sensor valve may provide a quick and convenient means to only use the water when needed.

The portable hose stand may be configured to be retained by a wall mount having one or more wall mount clips. Two or more clips that are spaced apart may be preferred as it provides a more stable retention of the portable hose stand. The wall mount clips may be configured to clip around the extension hose, or one or more of the retractable legs. The wall mount may have apertures for attachment of the wall mount to a wall, such as by screws.

An exemplary portable hose stand system may be configured to enable a large number of applications, such as washing a car, dog, or equipment rinsing hands, feet, or body, and sprinkling or watering the lawn, and the like. Any number of hose nozzles maybe coupled with the hose receiver and/or the motion sensor valve outlet. The hose nozzle may be extended up high to enable an outdoor shower, or for rinsing a vehicle. The extension legs and hose extensions may help to enable directing water in a desired an outstretched direction, such as up and into gutters, for example. A sprinkler head may be attached to the portable hose stand to enable watering the lawn or garden. The portable hose stand may be used when in the wall mount as an outdoor shower as well.

Portable, as used herein, means that the hose stand can be picked up and carried manually from one location to another and, as described herein, has legs for supporting a hose in an elevated position.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
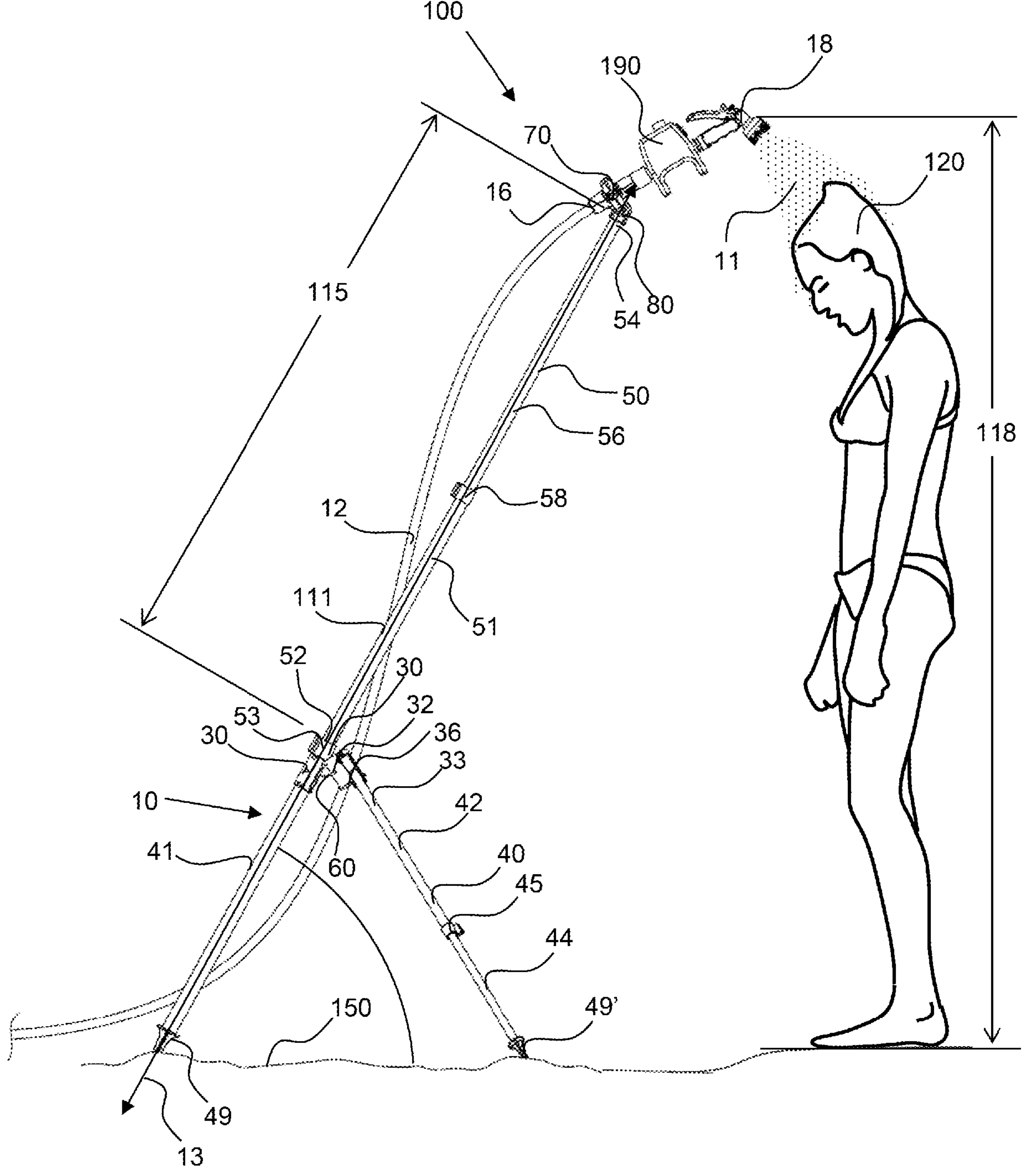
FIG. 1 shows a side view of the exemplary portable hose stand system with the retractable legs pivoted out from the extended leg and with the hose extension assembly extended to raise the hose nozzle up over the person's head for showering or for reaching higher target areas.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As shown in FIG. 1, the exemplary portable hose stand system 100 includes a portable hose stand 10 that is configured as a portable shower 111 with the retractable legs 40 pivoted out from the extension leg 41 and with the hose extension assembly 50 extended to raise the hose nozzle 18 up over a person 120, for showering. The extension leg extends along the extension axis 13 which is the axis in which the hose extension assembly extends from the stand body 30 to raise the hose nozzle. The hose extension assembly includes a coupled hose extension 51, and a first hose extension 56. The hose nozzle 18 is elevated up an elevated height 118 from the ground surface 150 to produce a water spray 11 from the hose nozzle that is above the person's head. A hose nozzle end 16 of the hose 12 is coupled with an inlet to the hose receiver 70. The hose receiver is coupled with the motion sensor valve 190 and the hose nozzle 18 is coupled with the motion sensor valve.

The stand assembly 33 comprises the extension leg 41, and two retractable legs 40 that pivot away from the extension leg and away from each other to provide three legs spaced apart for support of the portable hose stand. The leg assembly pivot 60 enables the leg receptacle 32, for the two retractable legs to pivot away from the extension leg 41. The leg pivot 36 enables the two retractable legs to pivot away from each other. The retractable legs have a leg body portion 42 and a first leg extension 44 that extends out from the leg body portion and is retained by the first leg retainer 45. Each of the legs have a ground end 49, 49'.

The hose extension assembly 50 comprises a coupled hose extension 51 that extends from the stand body 30 and a first hose extension 56 extending from the coupled hose extension and retained in an extended state by the hose extension retainer 58. The hose extension extends from the coupled end 52 to the extended end 54 a hose extension length 115. The coupled hose extension 51 is retained to the extension leg 41 or stand body 30 by a hose extension retainer 53, and the first hose extension 56 is retained in an extended position with respect to the coupled hose extension 51 by a hose extension retainer 58. The hose extension retainers may be collars or clamps that compress the two hose extensions together to prevent sliding. A hose receiver 70 is configured on the extended end 54 of the hose extension by a nozzle pivot 80 that enables the hose nozzle 18 to be pivoted about the hose extension or extension axis 13. A motion sensor valve 190 is configured between the hose receiver and the hose nozzle 18 and has a motion sensor to enable quick turning on and off of the spray of water from the hose nozzle.

Figures 2, 3:
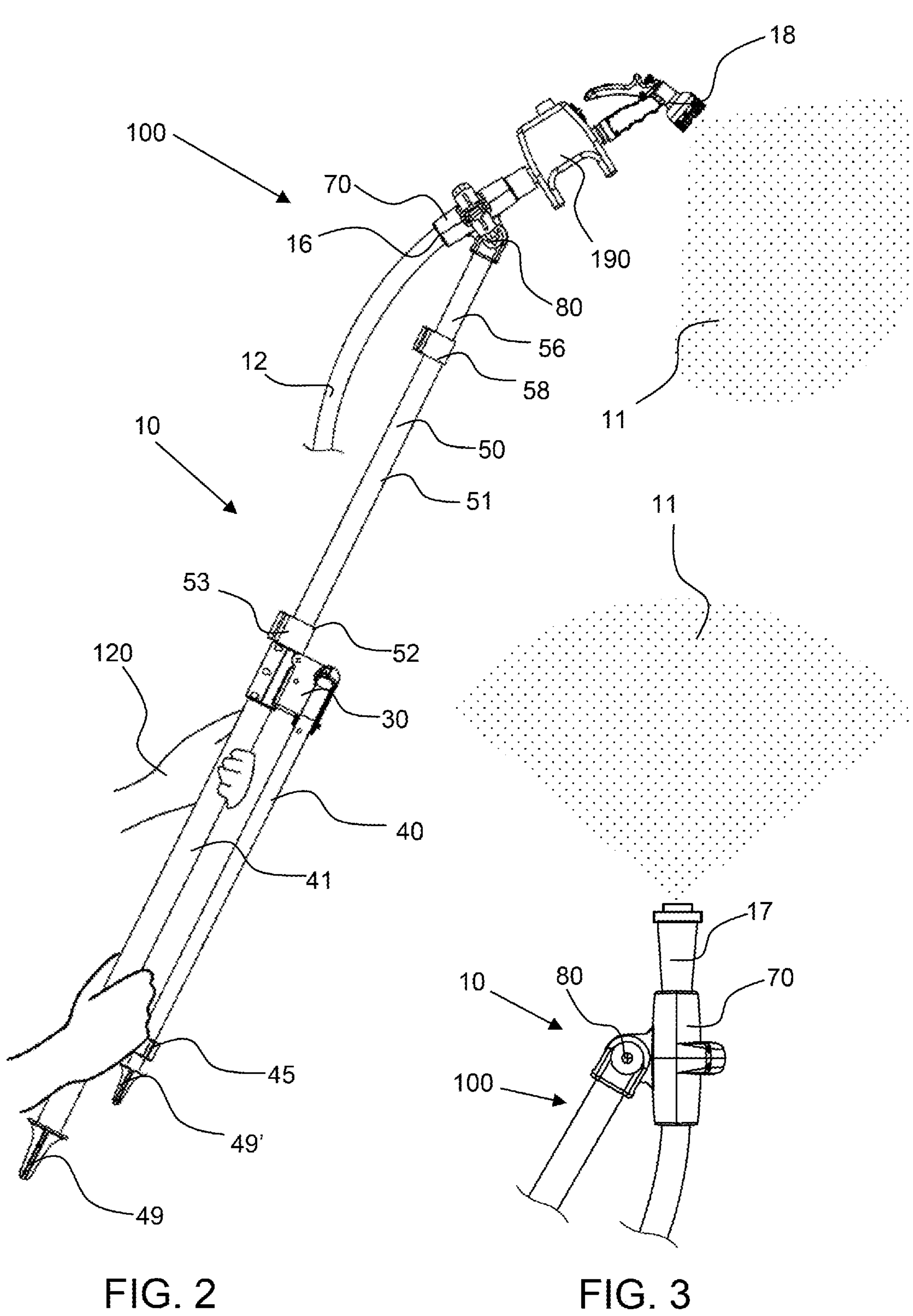
FIG. 2 shows a side view of the exemplary portable hose stand being held by a person to extend the spray from the hose nozzle up above the person.
FIG. 3 shows a side view of a sprinkle head nozzle retained by the hose receiver of the exemplary portable hose stand.

As shown in FIG. 2, the exemplary portable hose stand system 10 is being held by a person 120 to extend the water spray 11 from the hose nozzle 18 up above the person. Note that the hose extension assembly 50 is not fully extended with the first hose extension 56 only partially pulled out from the coupled hose extension 51.

As shown in FIG. 3, a sprinkler head nozzle 17 is retained by the hose receiver 70 of the exemplary portable hose stand system 10 to produce a water spray 11 that is directed upward to act as a sprinkler for a lawn, for example.

Figure 4:
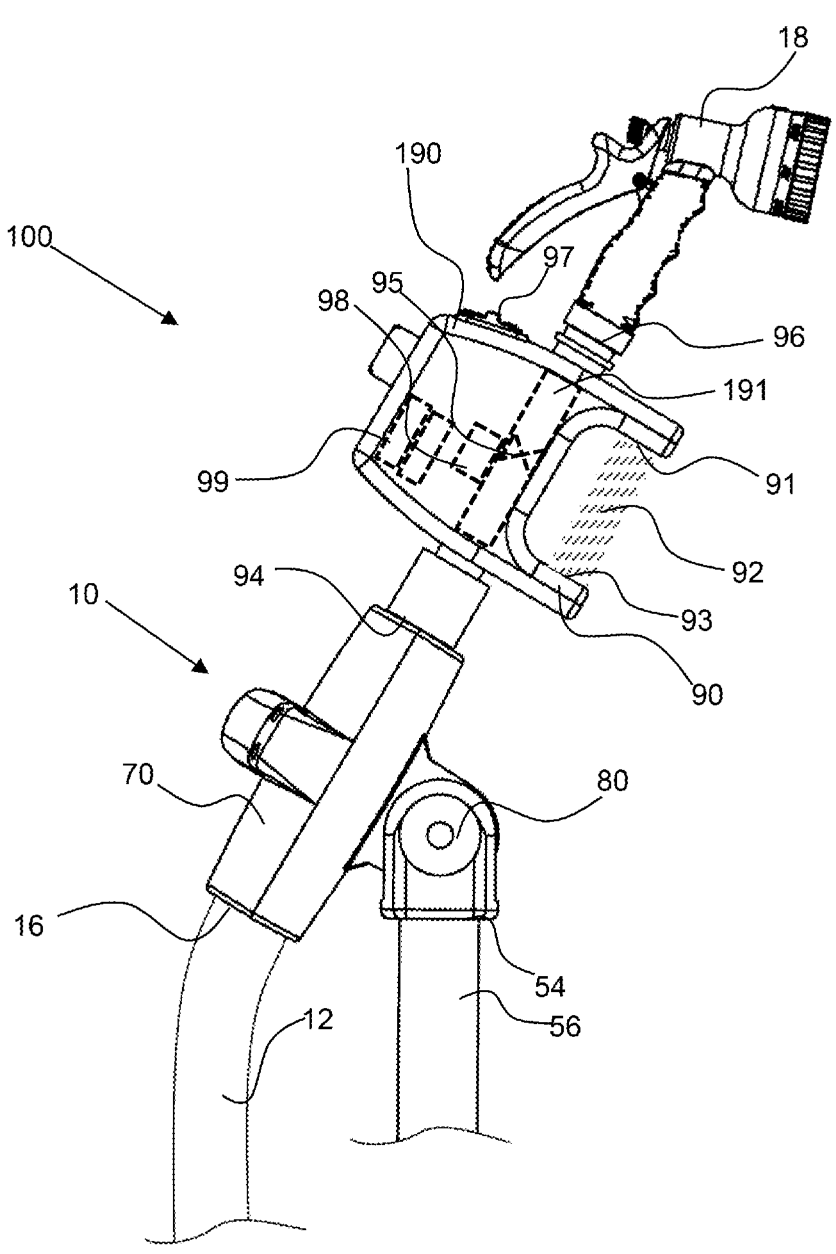
FIG. 4 shows a side view of a portion of the exemplary portable hose stand system having a motion sensor valve apparatus comprising a motion sensor that is coupled with a valve that opens and closes as a function of motion being detected.

As shown in FIG. 4, the exemplary portable hose stand system 10 has a motion sensor valve 190 comprising a motion sensor 90 that is coupled with a valve 95 that opens and closes as a function of motion being detected. The motion sensor may produce a sensor curtain 92 of light produced by an emitter 91 and received by a receiver 93. Breaking the light curtain by inserting a hand between the emitter and receiver is detected by the motion sensor and activates the valve actuator 98 to open or close the valve 95. The motion sensor valve has a water conduit 191 with an inlet 94 and outlet 96. The motion sensor valve may be battery operated and have one or more batteries 99. A lock-out switch 97 is configured to deactivate the motion sensor to enable uninterrupted use when operating the portable hose stand or to close the valve and lock it when not is use. Switching the lock-out switch will disable the valve actuator.

Figure 5:
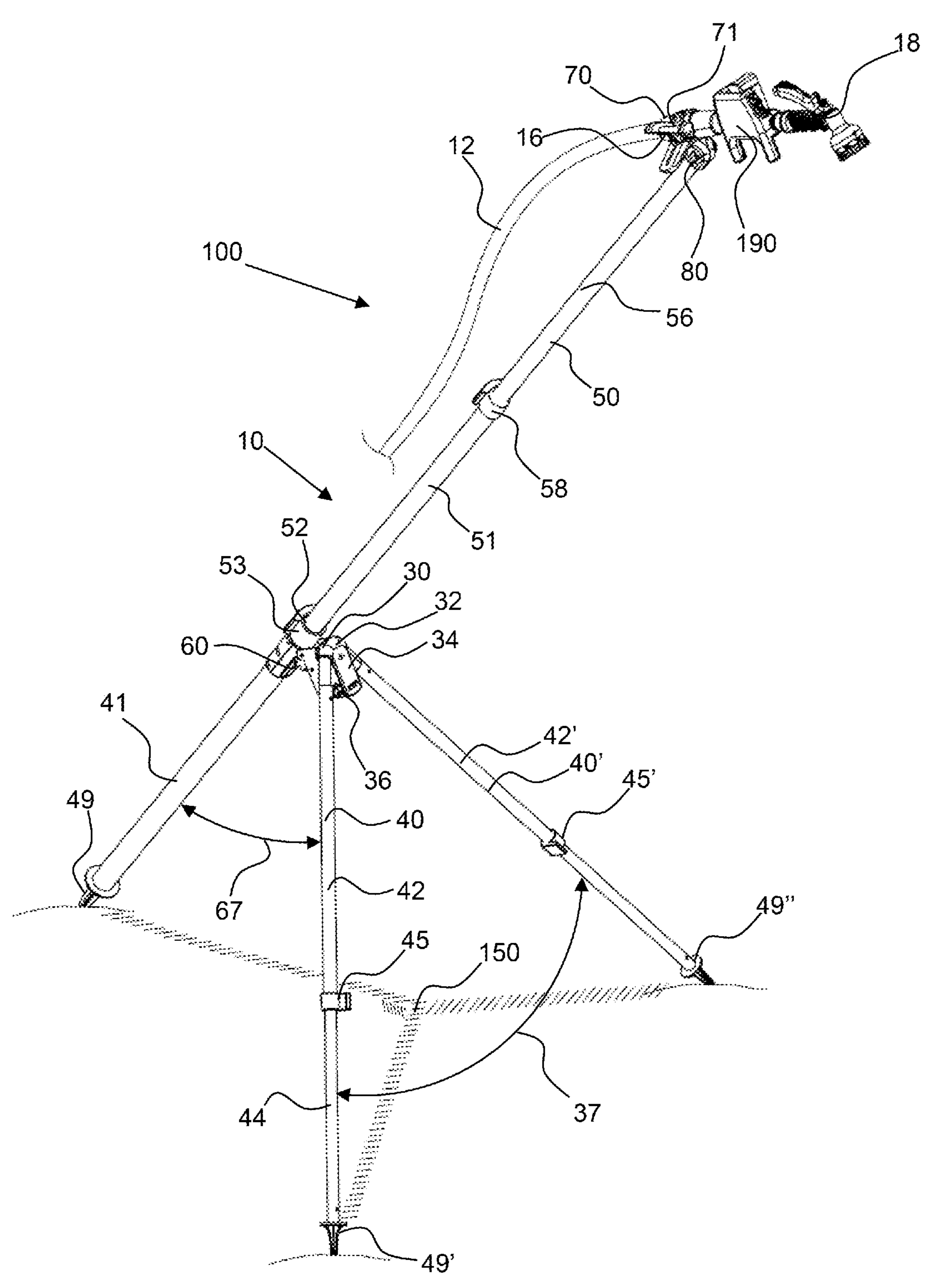
FIG. 5 shows a perspective view of the exemplary portable hose stand secured on a ground surface by the extension leg, extending from the hose extension and two retractable legs that are pivoted away from the extension leg by a leg assembly pivot and away from each other by a leg pivot.

As shown in FIG. 5, the exemplary portable hose stand system 10 is secured on a ground surface 150 by the extension leg 41, extending from the stand body 30 and two retractable legs 40, 40' that are pivoted away from the extension leg by a leg assembly pivot 60 and away from each other by a leg pivot 36. The leg receptacle 32 may automatically pivot away from the extension leg and the two retractable legs may automatically pivot away from each other when the leg release 34 is actuated. As shown the retractable leg and the leg receptacle are pivoted away from the extension leg 41 a retractable leg angle 67 and the two retractable legs 40, 40' are pivoted away from each other a leg angle 37. Again, the leg assembly spring 62 and the leg pivot spring may be released when the leg release 34 is actuated. The retractable legs may be individually extended to a desired length by pulling the first leg extension 44 out from the leg body portion 42 and securing in position by the first leg retainer. The stand assembly 33 may be placed on uneven ground and this individual adjustment and retention of the retractable leg length may provide better stability of the stand.

Figure 6:
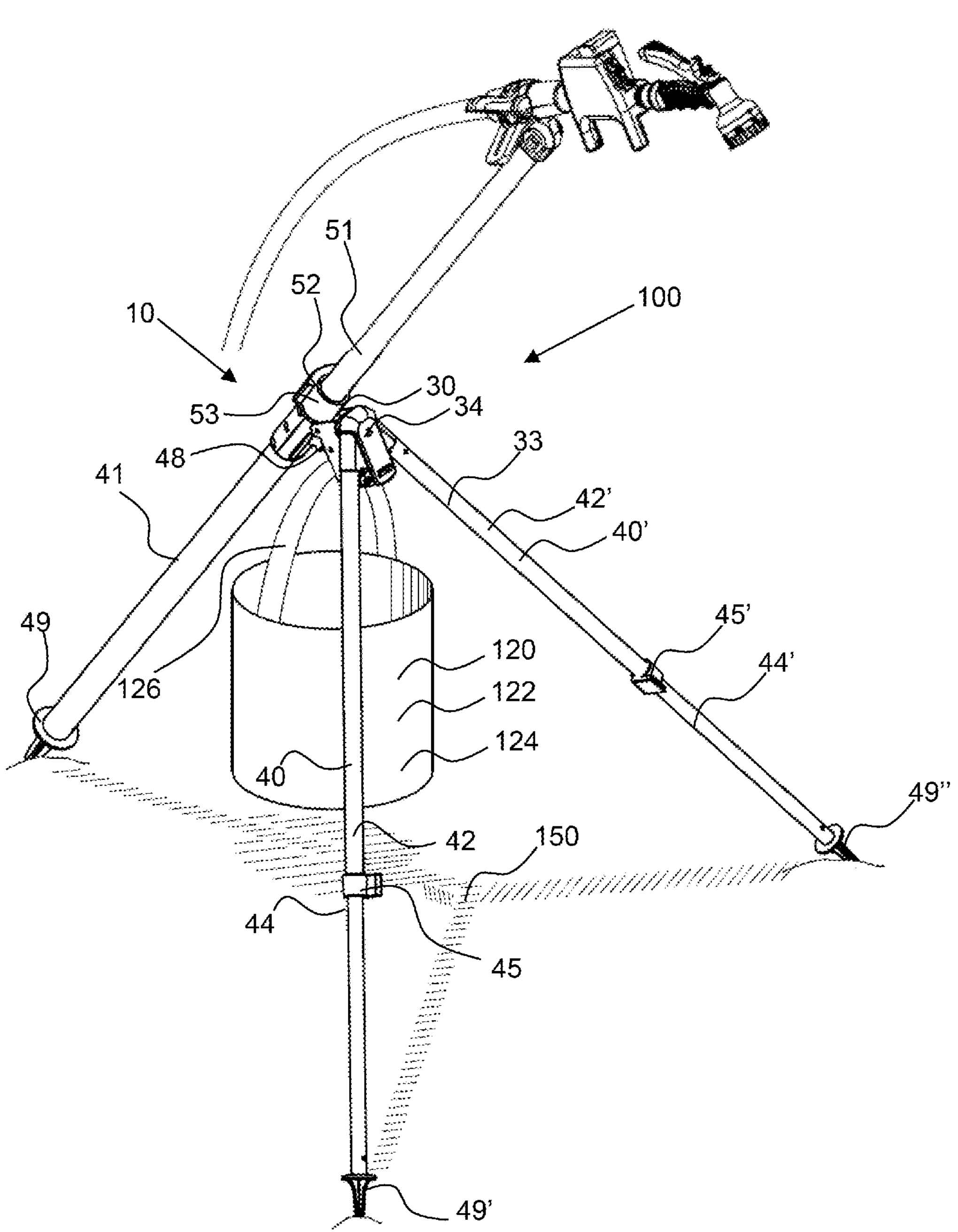
FIG. 6 shows a perspective view of a portion of the exemplary portable hose stand system secured on a ground surface and having a weight coupled to the stand to prevent the stand from tipping over during use.
Figures 7, 8, 9, 10:
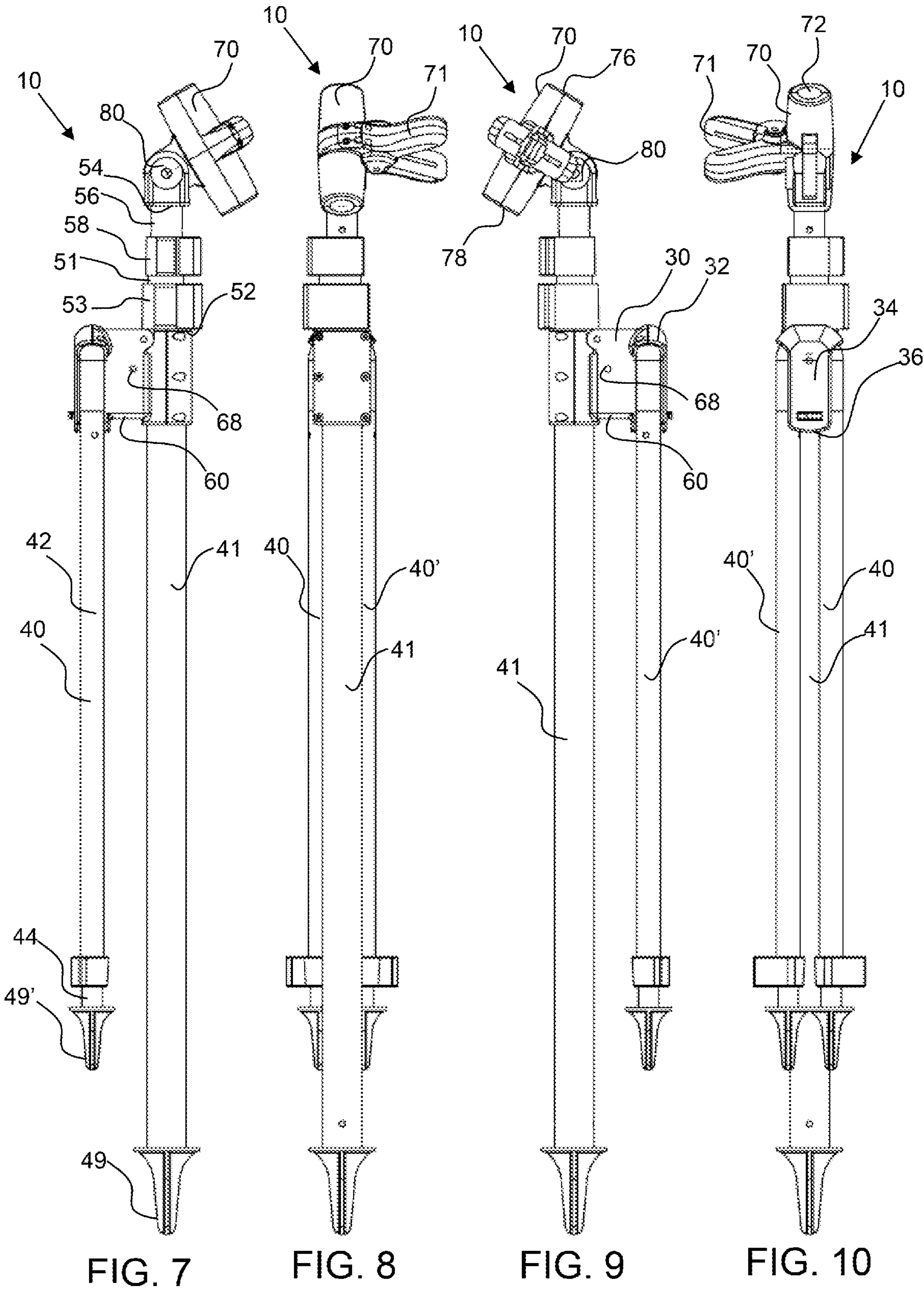
FIG. 7 shows a left side view of the exemplary portable hose stand.
FIG. 8 shows a back view of the exemplary portable hose stand.
FIG. 9 shows a right side view of the exemplary portable hose stand.
FIG. 10 shows front view of the exemplary portable hose stand.

As shown in FIG. 6, the exemplary portable hose stand system 10 is secured on a ground surface 150 and has a weight 120 coupled to the stand body 30 to prevent the stand assembly 33 from tipping over during use. The weight is a bucket 122, such as a collapsible bucket 124 having a weight retainer 126, such as a handle or loop to enable the weight bucket to hang from the stand assembly. In an exemplary embodiment, the weight 120 is a collapsible bucket 124 that can be filled with water to provide effective weight to stabilize the stand assembly 33. The collapsible bucket may be made from a fabric, which may be a coated fabric to make it waterproof. As shown in FIG. 6, the retractable legs 40, 40' each have a leg body portion 42, 42' and a first leg extension 44, 44' retained by the first leg retainer 45, 45'. Each of the legs has a ground end 49, 49' 49'' that may be detachably attachable to the leg.

Referring now to FIGS. 7 to 10, the exemplary portable hose stand system 10 is collapsible or retractable wherein the retractable legs 40, 40' are pivoted toward each other and toward the extension leg 41, and with the first hose extension 56 and coupled hose extension 51 retracted down to the stand body 30. The first hose extension may be slid down into the coupled hose extension and the coupled hose extension may be slid down into the extension leg. Also, as shown, the nozzle pivot 80 enables the hose retainer 70 to pivot for a desired water spray orientation. The hose retainer 70 has a receiver clamp to allow insertion of a hose therein. As shown the hose extension retainer 53 is configured to secure the coupled hose extension 51 in a position with respect to the stand body 30 and extension leg 41.

Figures 11, 12, 13, 14:
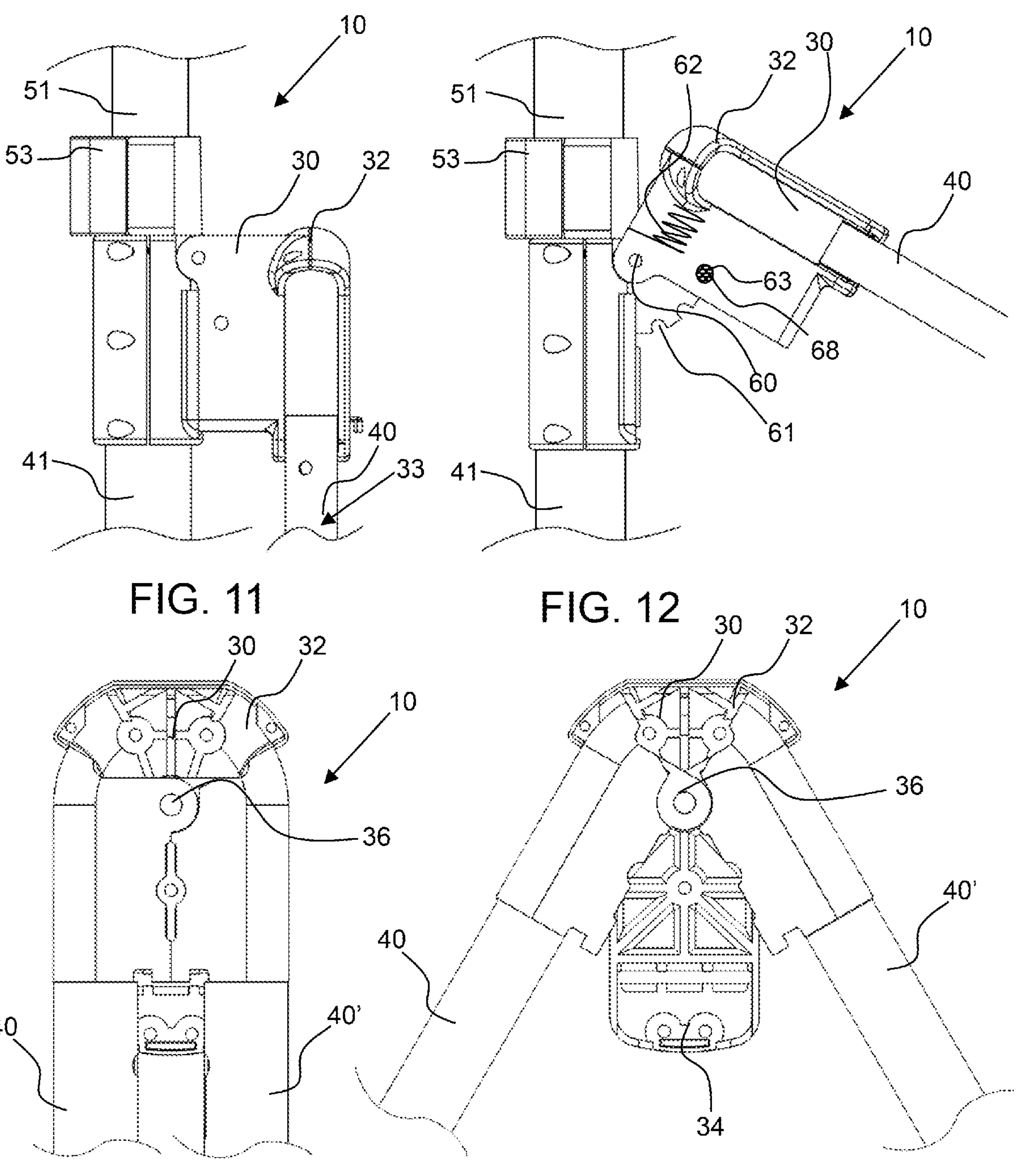
FIG. 11 shows a right side view of a portion of the exemplary portable hose stand with the leg receptacle pivoted into the extension leg.
FIG. 12 shows a right side view of a portion of the exemplary portable hose stand with the leg receptacle pivoted away from the extension leg.
FIG. 13 shows a back view of a portion of the exemplary portable hose stand with the retractable legs pivoted toward each other and retained by the stand body.
FIG. 14 shows a back view of a portion of the exemplary portable hose stand with the retractable legs pivoted away from each other by the leg pivot spring.
Figures 15, 16, 17, 18, 19:
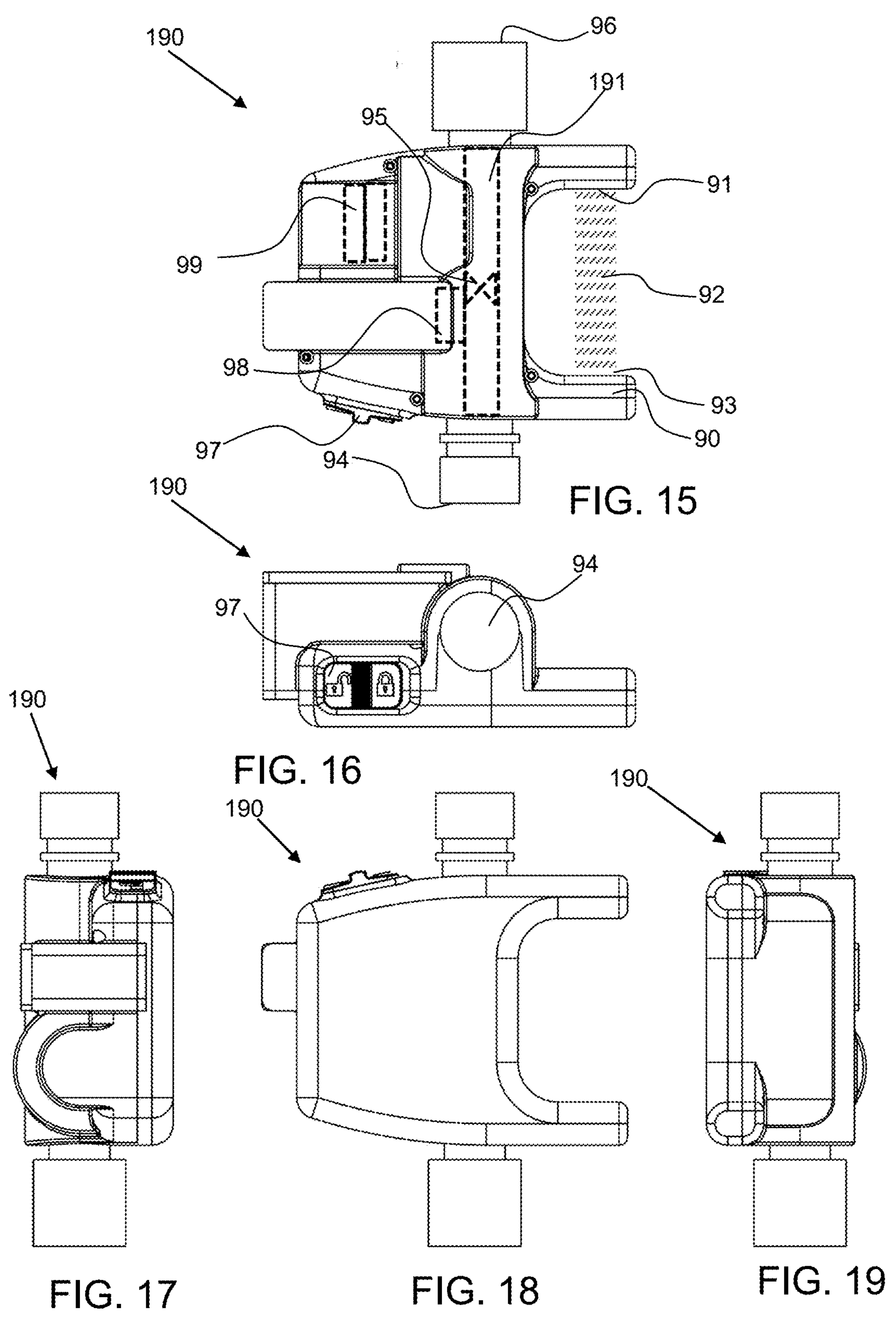
FIG. 15 shows a right side view of a motion sensor valve having a motion sensor valve having a motion sensor that is coupled with a valve actuator to open and close a valve for water supply to the hose nozzle, not shown.
FIG. 16 shows a bottom view of the motion sensor valve shown in FIG. 15.
FIG. 17 shows a back view of the motion sensor valve shown in FIG. 15.
FIG. 18 shows a left side view of the motion sensor valve shown in FIG. 15.
FIG. 19 shows a front view of the motion sensor valve shown in FIG. 15.

Referring now to FIGS. 11 to 14, the stand assembly 33 includes the stand body that couples together the legs and the hose extension. The stand body includes the top of the extension leg, the hose extension retainer 53, the leg receptacle 32 for the two retractable legs, the leg assembly pivot 60 and the pivot retainer 68. The two retractable legs, 40, 40' are configured to pivot away from the extension leg 41. The retractable legs are coupled with the leg receptacle 32 which pivots away from the extension leg by the leg assembly pivot 60 secured to the extension leg by the pivot retainer 68. A leg assembly spring 62 may force the retractable legs and the leg receptacle for the retractable legs away from the extension leg when the leg release 34 is actuated. As best shown in FIG. 12, the leg assembly pivot 60 may have a plurality of notches or pivot pin apertures 61 to receive a pivot pin 63 to retain the leg assembly in a pivoted position away from the extension leg 41. The two retractable legs pivot away from each other to a retractable leg angle 37, shown in FIG. 5, by the leg pivot spring, which may be a torsional spring. Both of these two pivoting motions may be automatic upon actuating the leg release 34. The two springs, the leg assembly spring 62 and the leg pivot spring may automatically force the retractable legs from the extension leg and spread the two retractable legs away from each other about the leg pivot 36.

Referring now to FIGS. 15 to 19, a motion sensor valve 190 has a motion sensor valve 95 coupled with valve actuator 98 to open and close a valve for water supply to the hose nozzle, not shown. The valve actuator is coupled with the motion sensor 90 that detects when a sensor curtain 92 is interrupted, such as by placing a hand between the emitter 91 and the receiver 93. The motion sensor valve has a water conduit 191 with an inlet 94 and outlet 96. The inlet and outlet may be threaded attachments to enable coupling with the hose, or hose receiver and/or with the hose nozzle, and/or sprinkler head. One or more batteries 99 may provide electrical power for operations of the motion sensor valve. A lock-out switch may enable a user to lock-out the valve to maintain a water flow or prevent water flow through the motion sensor valve.

Figure 20:
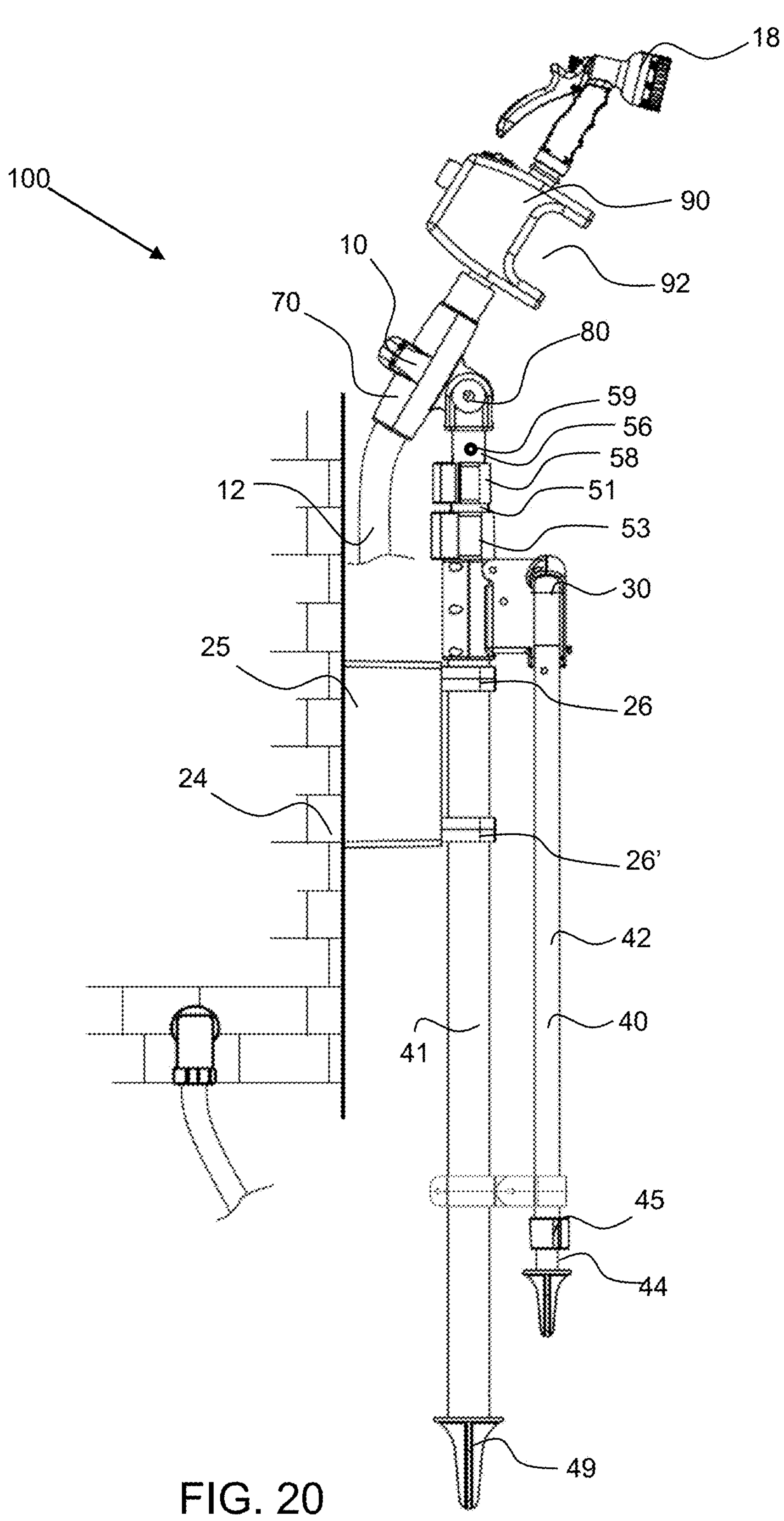
FIG. 20 shows a side view of the exemplary portable hose stand detachably attached to a wall mount.
Figures 21, 22, 23, 24:
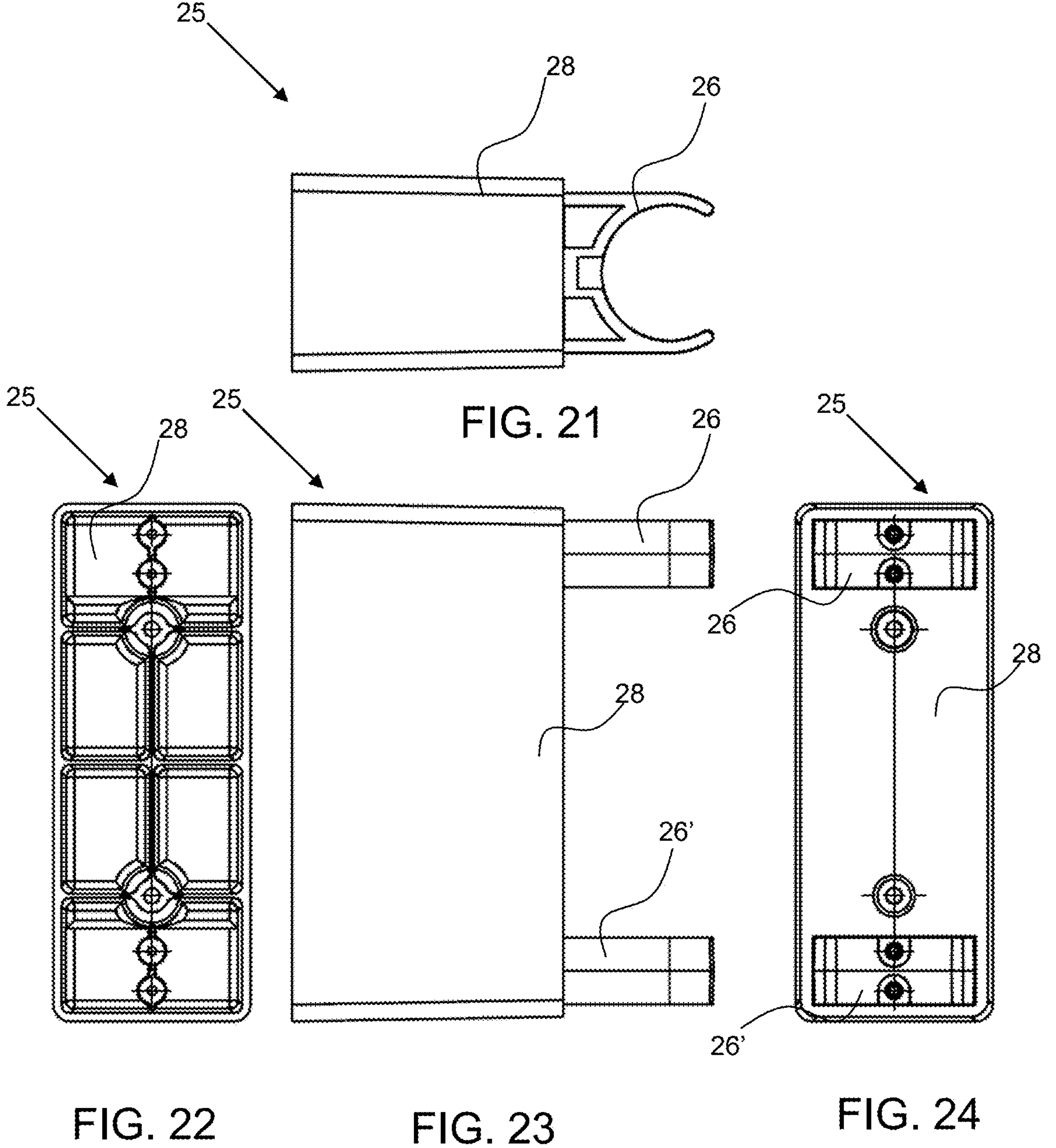
FIG. 21 shows a top view of an exemplary wall mount.
FIG. 22 shows a back view of the exemplary wall mount shown in FIG. 21.
FIG. 23 shows a right side view of the exemplary wall mount shown in FIG. 21.
FIG. 24 shows a front view of the exemplary wall mount shown in FIG. 21.

As shown in FIG. 20, the exemplary portable hose stand system 10 is detachably attached to a wall mount 25 by the wall mount clips 26, 26' that extend around the extension leg 41. The hose extension may be extended to enable the portable hose stand system to be used as a faucet or shower while mounted to the wall 24. Also, the nozzle pivot 80 is inserted into the first hose extension and is retained by a nozzle pivot post retainer 86, such as a ball, on the nozzle pivot post 84, shown in FIG. 26, extending into a nozzle-extension retainer 59, such as an aperture, for the ball to extend therethrough.

Referring now to FIGS. 21 to 24, an exemplary wall mount 25 has a pair of wall mount clips 26 configured to receive the extension leg. This spaced apart arrangement of the wall mount clips provides better and more effective retention of the hose stand system assembly 10. Apertures are configured through the wall mount body 28 for securing the wall mount 25 to a wall.

Figures 25, 26, 27:
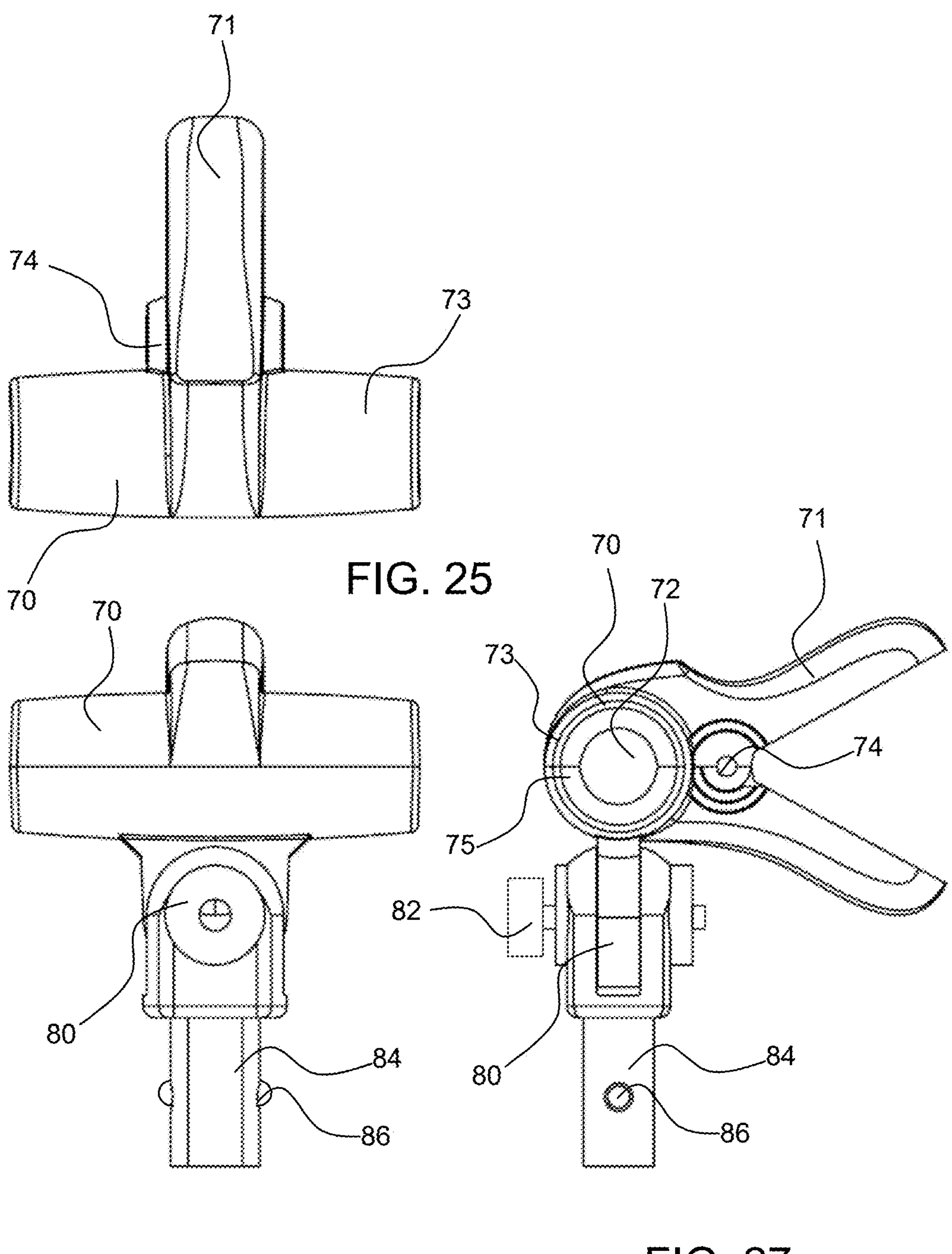
FIG. 25 shows a top view of an exemplary hose receiver having a receiver clamp to open and close the hose receiver channel.
FIG. 26 shows a front view of the hose receiver shown in FIG. 25 coupled with a nozzle pivot having a nozzle pivot post.
FIG. 27 shows a front view of the hose receiver shown in FIG. 25 coupled with a nozzle pivot having a nozzle pivot post.

Referring now to FIGS. 25 to 27, an exemplary hose receiver 70 has a receiver clamp 71 to open and close the hose receiver channel 72. The receiver clamp 71 is coupled with the first receiver portion 73 and the second receiver portion 75 about the hose receiver pivot 74. Squeezing the receiver clamp actuates the first receiver portion 73 to move away from the second receiver portion to open the receiver channel 72 for insertion of a hose. Also, the hose receiver is coupled with the nozzle pivot 80 that enables the hose receiver to be pivoted as desired and then locked into position by the nozzle pivot lock 82, such as a knob that can be turned. The nozzle pivot post 84 extends from the nozzle pivot 80 and has a nozzle pivot post retainer 86 to secure said post in a receiver.

Figure 28:
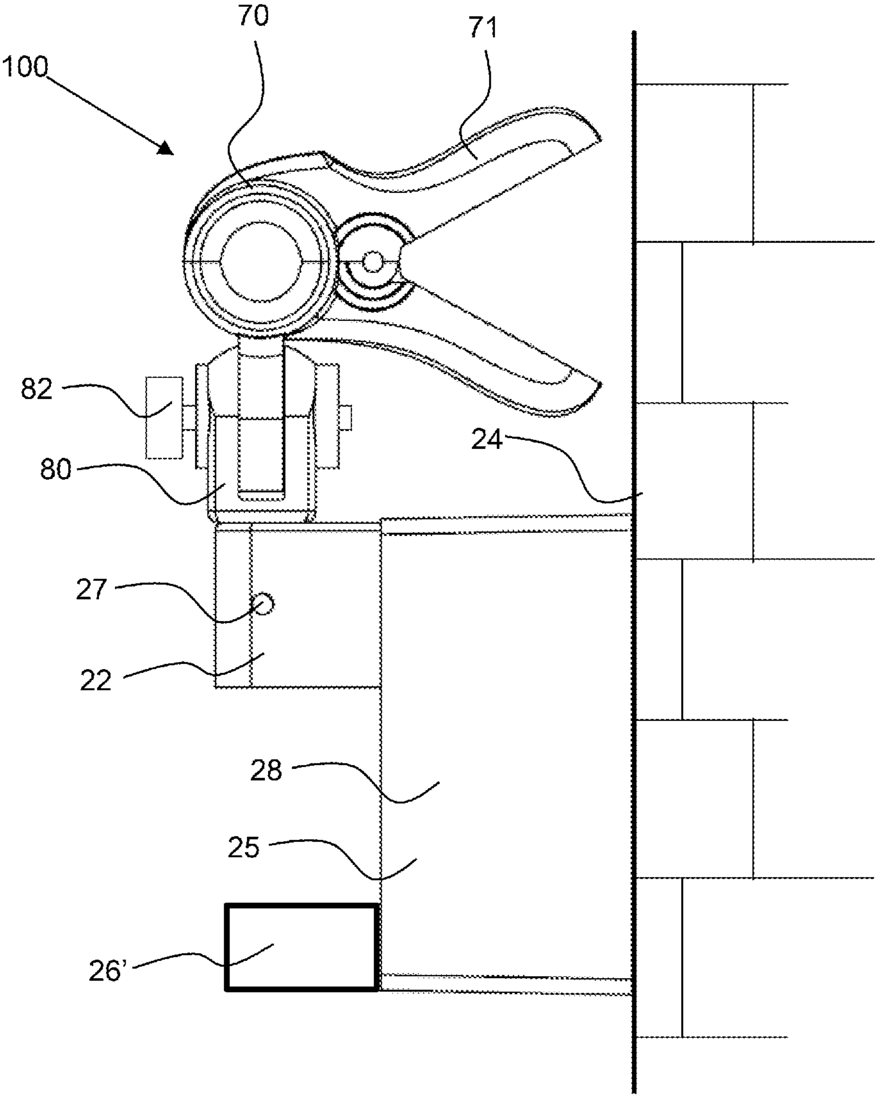
FIG. 28 shows the hose receiver shown in FIG. 25 coupled with a wall mount by the nozzle pivot post.

As shown in FIG. 28, the hose receiver 70 shown in FIG. 25 is coupled with a wall mount 25 by the nozzle pivot post 84 being inserted into wall mount adaptor 22 having a wall mount retainer 27 to engage with the nozzle pivot post retainer to retain the nozzle pivot post therein. These retainers may be a ball and detent arrangement.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A portable hose stand system comprising:

a) a portable hose stand comprising:

i) a stand assembly comprising:

a stand body;

an extension leg:

retractable legs coupled with the stand body;

wherein the retractable legs are configured to extend down from the stand body and support the stand body in an elevated position above a ground surface;

ii) a hose receiver configured to couple with a hose; and iii) a nozzle pivot coupled with said hose receiver and configured to adjust an orientation of said hose;

iv) a hose nozzle;

v) a motion sensor valve configured between the hose receiver and the hose nozzle, and comprising:

a conduit having an inlet for coupling with the hose and an outlet for coupling with the hose nozzle;

a valve coupled with the conduit;

a valve actuator coupled with the valve and configured to open and close the valve; and a motion sensor comprising a light emitter and light receiver, the motion sensor valve comprising a C-shaped recess, wherein the light emitter is located on one end of the recess and the light receiver is configured on an opposite end of the recess such that the light emitter creates a sensor curtain of light that spans the C-shaped recess and is received by the light receiver; and wherein the valve actuator is configured to open the valve when the motion sensor detects motion within the sensor curtain.

2. The portable hose stand system of claim 1, wherein the retractable legs are configured to pivot away from each other a leg angle of at least 30 degrees.

3. The portable hose stand system of claim 2, wherein each of the retractable legs comprise:

a) a leg body portion;

b) a first leg extension; and c) a first leg retainer;

wherein the first leg retainer is configured between the leg body portion and the first leg extension and is configured to retain the first leg extension in an extended position from the leg body portion.

4. The portable hose stand system of claim 1, further comprising a hose extension configured to extend out from the stand body;

wherein the hose extension is configured to slide into and out of the extension leg.

5. The portable hose stand system of claim 4, further comprising a hose extension retainer configured to retain the hose extension in an extended position from the extension leg.

6. The portable hose stand system of claim 5, further comprising a first hose extension that extends from the coupled hose extension, and a second hose extension retainer configured between the coupled hose extension and the first hose extension to retain the first hose extension in an extended position from the hose extension.

7. The portable hose stand system of claim 6, wherein the first hose extension is configured to slide into and out of the hose extension.

8. The portable hose stand system of claim 1, wherein the hose receiver has a channel for receiving the hose and a receiver clamp to open said channel for receiving said hose.

9. The portable hose stand system of claim 8, wherein the hose receiver has a first receiver portion coupled to a second receiver portion by a hose receiver pivot.

10. The portable hose stand system of claim 1, wherein the motion sensor valve further comprises a lock-out switch to lock the valve in a fixed position.

11. The portable hose stand system of claim 1, further comprising a wall mount configured to couple to a wall and retain the portable hose stand to said wall mount.

12. The portable hose stand system of claim 1, further comprising a weight that is detachably attachable to the portable hose stand to provide stability.

13. The portable hose stand system of claim 12, wherein the weight is a collapsible bucket having a handle configured to detachably attach to the portable hose stand under the stand body and between the extension leg and the retractable legs.

* * * * *